US009229093B2

(12) United States Patent
Su (10) Patent No.: US 9,229,093 B2
(45) Date of Patent: Jan. 5, 2016

(54) METHOD FOR ESTIMATING A LOCATION OF AN ELECTRONIC DEVICE WITH AID OF INFORMATION CARRIED BY RESPONSES CORRESPONDING TO ONE BROADCAST REQUEST SENT TO MULTIPLE DEVICES, AND ASSOCIATED APPARATUS

(71) Applicant: MEDIATEK INC., Hsin-Chu (TW)

(72) Inventor: Shih-Chang Su, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 157 days.

(21) Appl. No.: 14/055,892

(22) Filed: Oct. 17, 2013

(65) Prior Publication Data
US 2014/0315578 A1     Oct. 23, 2014

Related U.S. Application Data

(60) Provisional application No. 61/813,198, filed on Apr. 18, 2013.

(51) Int. Cl.
| | |
|---|---|
| *H04W 24/00* | (2009.01) |
| *G01S 5/10* | (2006.01) |
| *H04W 64/00* | (2009.01) |
| *G01S 5/02* | (2010.01) |
| *G01S 5/14* | (2006.01) |

(52) U.S. Cl.
CPC ............... *G01S 5/10* (2013.01); *G01S 5/0205* (2013.01); *G01S 5/14* (2013.01); *H04W 64/00* (2013.01)

(58) Field of Classification Search
CPC ..... H04W 64/00; H04W 64/003; H04W 4/02; H04W 4/023; H04W 4/025

USPC .......................................... 455/456.1, 456.2
See application file for complete search history.

(56) References Cited

U.S. PATENT DOCUMENTS

| | | |
|---|---|---|
| 8,175,613 B2 | 5/2012 | Patil |
| 8,326,260 B1 | 12/2012 | Bradish |

(Continued)

FOREIGN PATENT DOCUMENTS

WO     2014137613 A1     9/2014

OTHER PUBLICATIONS

Chris Savarese, Jan Rabaey, Koen Langendoen, "Robust Positioning Algorithms for Distributed Ad-Hoc Wireless Sensor Networks", published in the Proceedings of the 2002 USENIX Annual Technical Conference, pp. 317-327, Jun. 2002, Monterey Conference Center, Monterey, California, USA.

*Primary Examiner* — Temica M Beamer
(74) *Attorney, Agent, or Firm* — Winston Hsu; Scott Margo (57) ABSTRACT

A method for estimating a location of an electronic device and an associated apparatus are provided, where the method includes the steps of: sending a pre-association broadcast request frame by the electronic device to multiple responders in a wireless network system; receiving a plurality of response frames corresponding to the pre-association broadcast request frame from the multiple responders; and performing a timing measurement according to information carried by the plurality of response frames for determining the location of the electronic device. For example, each of the response frames is sent from one of the responders, and each of the responders sends only one response frame corresponding to the pre-association broadcast request frame. As a result, the power consumption can be greatly decreased, and the related art problem of insufficiency of the total channel capacity of the wireless network system can be prevented.

20 Claims, 4 Drawing Sheets (56) References Cited

U.S. PATENT DOCUMENTS

2006/0267841 A1* 11/2006 Lee et al. .................. 342/463
2007/0298761 A1* 12/2007 Bani Hani ................ 455/404.2
2008/0153509 A1* 6/2008 Piekarski .................. 455/456.2
2010/0135178 A1 6/2010 Aggarwal
2011/0053613 A1* 3/2011 Zhou et al. ................ 455/456.5

* cited by examiner

METHOD FOR ESTIMATING A LOCATION OF AN ELECTRONIC DEVICE WITH AID OF INFORMATION CARRIED BY RESPONSES CORRESPONDING TO ONE BROADCAST REQUEST SENT TO MULTIPLE DEVICES, AND ASSOCIATED APPARATUS

CROSS REFERENCE TO RELATED APPLICATIONS

This application claims the benefit of U.S. Provisional Application No. 61/813,198, which was filed on Apr. 18, 2013, and is included herein by reference.

BACKGROUND

The present invention relates to location estimation with a reduced number of frame exchanges between electronic devices in a wireless network system, and more particularly, to a method for estimating a location of an electronic device, and to an associated apparatus.

According to the related art, a conventional electronic device in a wireless network system can be designed to determine the location of the conventional electronic device in a situation where the locations of reference points (for example, APs) in the wireless network system and the time of flight (or the time of electromagnetic wave propagation) between the conventional electronic device and each of the reference points are known. However, some problems may occur. For example, before the conventional measurement operations in the conventional timing measurement procedure are performed, it is typically needed to scan and find out the wireless local area network (WLAN) access points (APs) that support WLAN positioning in advance, and therefore, the conventional electronic device should frequently scan for surrounding APs that are usable, causing the power consumption of the conventional electronic device to be greatly increased. In another example, for each of the WLAN APs that support WLAN positioning, three frame exchange sequences are typically required, where one of the three frame exchange sequences may need a frame sent from the conventional electronic device to the WLAN AP under consideration and the corresponding acknowledgement frame sent from this WLAN AP to the conventional electronic device, and each of the other two of the three frame exchange sequences may need a frame sent from this WLAN AP to the conventional electronic device and the corresponding acknowledgement frame sent from the conventional electronic device to this WLAN AP. More particularly, as the number of frame exchanges for the timing measurement is typically proportional to the number of peer devices under consideration and the frequency of updates, the total channel capacity of the wireless network system may be insufficient in some situations (e.g. the frequency of updates increases, and/or the number of users who need positioning in the wireless network system are many). As a result, service delay or poor quality of the positioning service may occur since there are too many frame exchanges in the wireless network system. Thus, a novel method is required for improving the location estimation of an electronic device in a wireless network system.

SUMMARY

It is an objective of the claimed invention to provide a method for estimating a location of an electronic device, and to an associated apparatus, in order to solve the above-mentioned problems.

It is another objective of the claimed invention to provide a method for estimating a location of an electronic device, and to an associated apparatus, in order to reduce the number of frame exchanges in a wireless network system.

According to at least one preferred embodiment, a method for estimating a location of an electronic device is provided, where the method comprises the steps of: sending a pre-association broadcast request frame by the electronic device to multiple responders in a wireless network system; receiving a plurality of response frames corresponding to the pre-association broadcast request frame from the multiple responders; and performing a timing measurement according to information carried by the plurality of response frames for determining the location of the electronic device. More particularly, each of the response frames is a pre-association uni-cast response frame received from one of the responders. For example, the pre-association broadcast request frame can be a probe request frame, and the pre-association uni-cast response frame can be a probe response frame. In another example, the pre-association broadcast request frame can be a Generic Advertisement Service (GAS) request frame, and the pre-association uni-cast response frame can be a GAS response frame.

According to at least one preferred embodiment, an apparatus for estimating a location of an electronic device is provided, where the apparatus comprises at least one portion of the electronic device. The apparatus comprises a processing circuit arrange to control operations of the electronic device, and further comprises a transceiver arranged to transmit or receive information for the electronic device, where the processing circuit is coupled to the transceiver. In addition, the processing circuit sends, by utilizing the transceiver, a pre-association broadcast request frame to multiple responders in a wireless network system, receives a plurality of response frames corresponding to the pre-association broadcast request frame from the multiple responders, and performs a timing measurement according to information carried by the plurality of response frames for determining the location of the electronic device. More particularly, each of the response frames is a pre-association uni-cast response frame received from one of the responders. For example, the pre-association broadcast request frame can be a probe request frame, and the pre-association uni-cast response frame can be a probe response frame. In another example, the pre-association broadcast request frame can be a GAS request frame, and the pre-association uni-cast response frame can be a GAS response frame.

It is an advantage of the present invention that the present invention method and apparatus can use merely one request such as a single request frame sent from the electric device to multiple peer devices such as multiple access points (APs) to immediately trigger responses from these APs, and after each of these APs responses with only one frame, no further frame exchange is required for completing the timing measurement for location estimation. In addition, it is unnecessary to perform any AP scanning procedure of the related art. As a result, the power consumption can be greatly decreased, and the related art problem of insufficiency of the total channel capacity of the wireless network system can be prevented.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
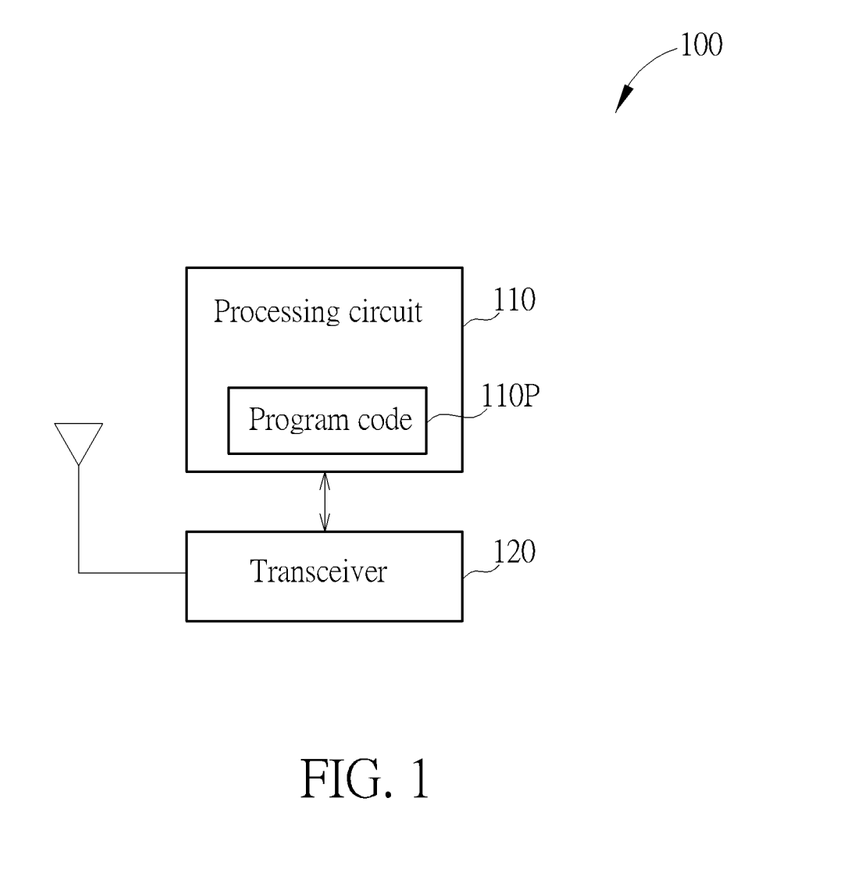
FIG. 1 is a diagram of an apparatus for estimating a location of an electronic device according to a first embodiment of the present invention.

Please refer to FIG. 1, which illustrates a diagram of an apparatus 100 for estimating a location of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a processing circuit 110 arrange to control operations of the electronic device, and may further comprise a transceiver 120 arranged to transmit or receive information for the electronic device, where the transceiver 120 is coupled to the processing circuit 110, and one or more antennas of the electronic device may be coupled to the transceiver 120. For example, the processing circuit 110 may comprise at least one processor and associated hardware resources, and the transceiver 120 may comprise a transmitter and a receiver such as those for wireless network communications, where the processor may execute some program codes 110P retrieves from a storage module (e.g. a hard disk drive (HDD), or a non-volatile memory such as a Flash memory) within the electronic device to control the aforementioned operations of the electronic device.

According to this embodiment, the processing circuit 110 may send, by utilizing the transceiver 120, a pre-association broadcast request frame to some peer devices in a wireless network system. The peer devices may respond to the pre-association broadcast request frame by sending pre-association uni-cast response frames to the electronic device, respectively, so the timing measurement can be performed immediately. Thus, the electronic device can be regarded as the initiator, and the peer devices can be regarded as the responders. More particularly, the initiator may uses the pre-association broadcast (or multicast) request frame, such as a probe request or a Generic Advertisement Service (GAS) request, as a timing measurement request to solicit multiple responders to directly perform timing measurement operations to obtain information regarding the time of flight (or the time of electromagnetic wave propagation) between the electronic device and each of the responders whose locations are known. For example, each of the responders may send a pre-association uni-cast response frame, such as a probe response frame or a GAS response frame, to notify the initiator of related information stored or obtained within the responder under consideration.

As a result of using the pre-association broadcast request frame sent from the electric device to the responders to initiate the timing measurement, the total number of exchange frames of multiple peers can be reduced significantly in comparison with the related art, where it is unnecessary to perform peer-to-peer IEEE 802.11v timing measurement frame handshaking of the related art or the aforementioned access point (AP) scanning procedure of the related art. In addition, the time and power consumption of the additional discovery phase of the related art and the information query phase of the related art can be saved since all information required can be obtained during (or before) the timing measurement process triggered by the pre-association broadcast request frame. For example, the locations of the responders can be carried by the aforementioned pre-association uni-cast response frames, and therefore can be sent to the electronic device right after the pre-association broadcast request frame is sent. In another example, the locations of the responders can be retrieved from the Internet or somewhere else (e.g. a database) in the wireless network system, rather than being sent from the responders at this moment during the timing measurement. In another example, the locations of the responders can be carried by some beacons sent from the responders during (or before) the timing measurement process triggered by the pre-association broadcast request frame.

Figure 2:
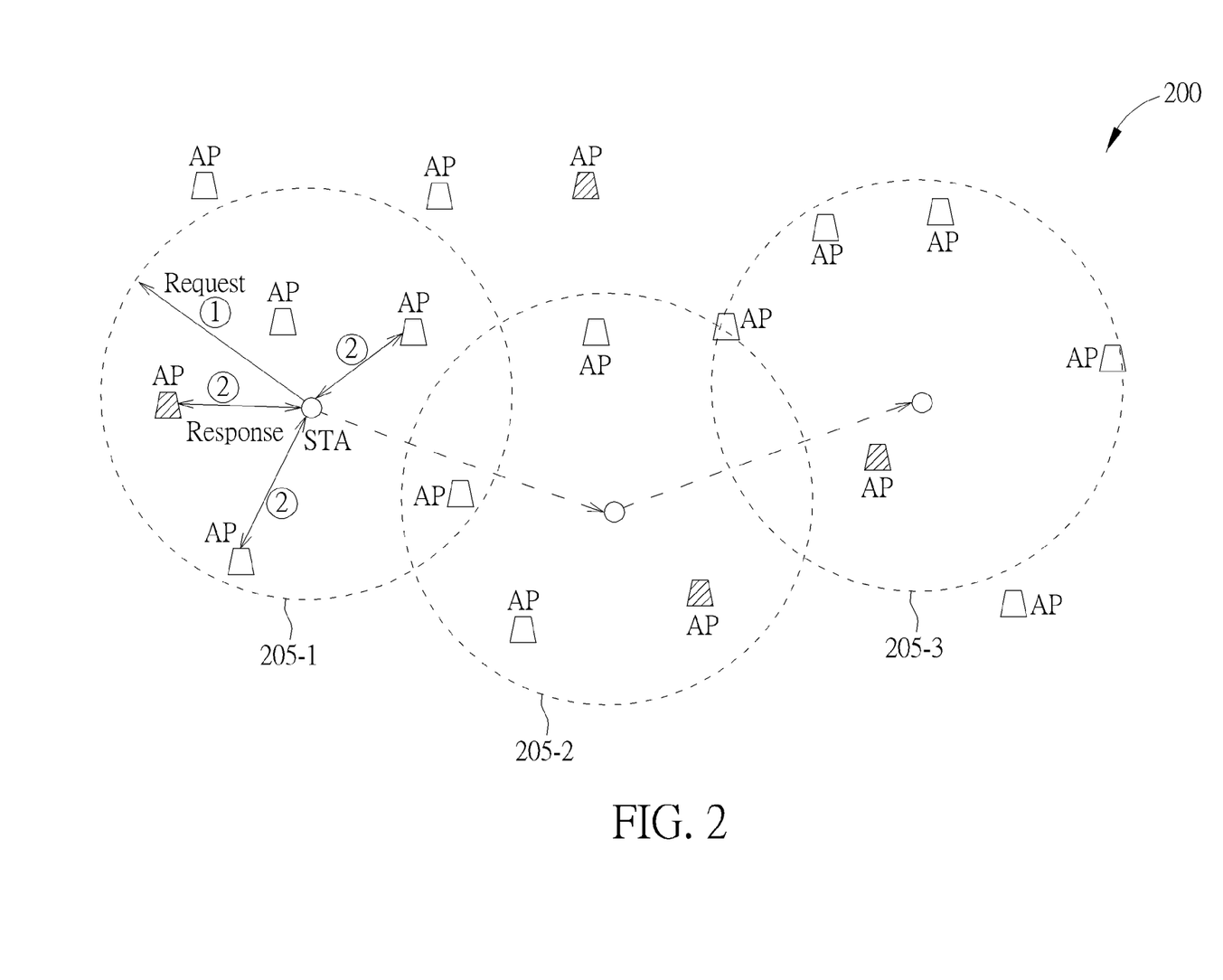
FIG. 2 illustrates a wireless network system comprising the aforementioned electronic device according to an embodiment of the present invention.

FIG. 2 illustrates a wireless network system 200 comprising the aforementioned electronic device of the embodiment shown in FIG. 1 according to an embodiment of the present invention, where the wireless network system 200 can be taken as an example of the aforementioned wireless network system in the embodiment shown in FIG. 1. As shown in FIG. 2, the electronic device in this embodiment (labeled "STA" in FIG. 2, where the notation "STA" stands for "Station") may move from a point to another point since the user of the electronic device may carry the electronic device to walk around. For example, the user carrying the electronic device may move to region 205-1, and the apparatus 100 may control the electronic device to send a single request (labeled "Request" in FIG. 2) to start performing the timing measurement for the location estimation corresponding to the STA in the region 205-1, and then some of the peer devices (labeled "AP" in FIG. 2, where the notation "AP" stands for "Access Point") in the wireless network system 200 is triggered to send responses to the electronic device, respectively, where the notations "1" and "2" labeled on the request and the responses illustrated within the region 205-1 indicate that the request is sent first and then the responses are sent. Similarly, the user carrying the electronic device may move to region 205-2, and the apparatus 100 may control the electronic device to send a single request to start performing the timing measurement for the location estimation corresponding to the STA in the region 205-2, in order to update the location of the electronic device. Similarly, the user carrying the electronic device may move to region 205-3, and the apparatus 100 may control the electronic device to send a single request to start performing the timing measurement for the location estimation corresponding to the STA in the region 205-3, in order to update the location of the electronic device.

Figure 3:
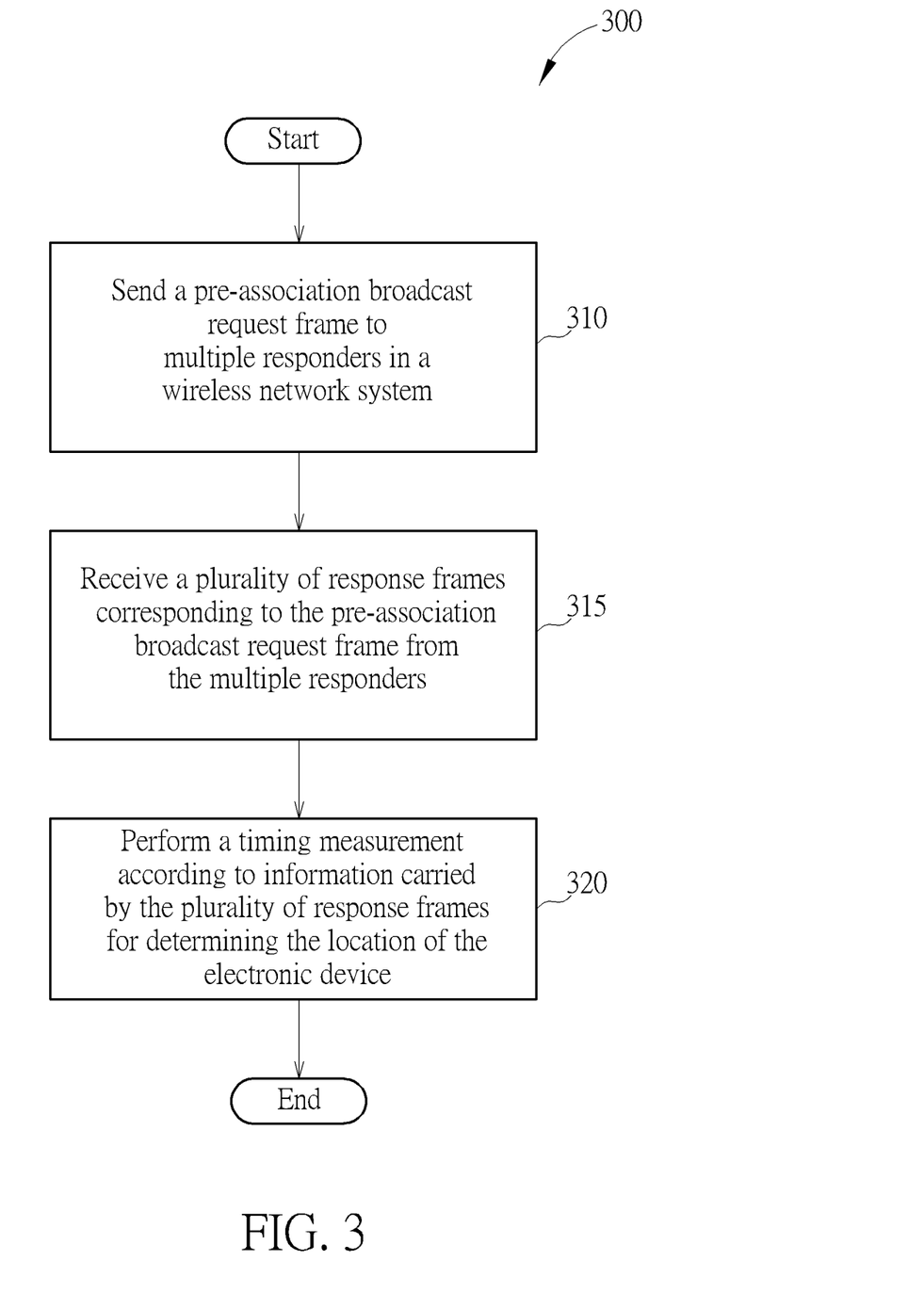
FIG. 3 illustrates a flowchart of a method for estimating a location of an electronic device according to an embodiment of the present invention.

FIG. 3 illustrates a flowchart of a method 300 for estimating a location of an electronic device according to an embodiment of the present invention. The method shown in FIG. 3 can be applied to the apparatus 100 shown in FIG. 1 (more particularly, the electronic device STA of the embodiment shown in FIG. 2), and can be applied to the processing circuit 110 thereof (more particularly, the processing circuit 110 executing the program codes 110P of the embodiment shown in FIG. 1). The method is described as follows.

In Step 310, the processing circuit 110 sends, by utilizing the transceiver 120, a pre-association broadcast request frame such as that mentioned above to multiple responders in a wireless network system such as the wireless network system 200. For example, the pre-association broadcast request frame can be a probe request frame. In another example, the pre-association broadcast request frame can be a GAS request frame.

In Step 315, the processing circuit 110 receives a plurality of response frames corresponding to the pre-association broadcast request frame from the multiple responders mentioned in Step 310.

In Step 320, the processing circuit 110 performs a timing measurement according to information carried by the plurality of response frames for determining the location of the electronic device, where each of the response frames can be sent from one of the responders. For example, within the plurality of response frames, the number of response frame received from any of the responders is equal to one. That is, each of the responders sends only one response frame corresponding to the pre-association broadcast request frame mentioned in Step 310. This is for illustrative purposes only, and is not meant to be a limitation of the present invention. In another example, the number of response frame received from one of the responders can be varied (e.g. increased) as long as implementation of the present invention will not be hindered.

According to this embodiment, each of the response frames can be a pre-association uni-cast response frame received from one of the responders, such as the pre-association uni-cast response frame mentioned in the embodiment shown in FIG. 1. For example, in a situation where the pre-association broadcast request frame is a probe request frame, this pre-association uni-cast response frame can be a probe response frame. In another example, in a situation where the pre-association broadcast request frame is a GAS request frame, this pre-association uni-cast response frame can be a GAS response frame.

According to some embodiments of the present invention, such as some variations of the embodiment shown in FIG. 3, as updating the location of the electronic device may be needed, the whole working flow of the method 300 can be repeated. For example, after the operations of Step 320 are completed, Step 310 can be re-entered for updating the location of the electronic device.

Figure 4:
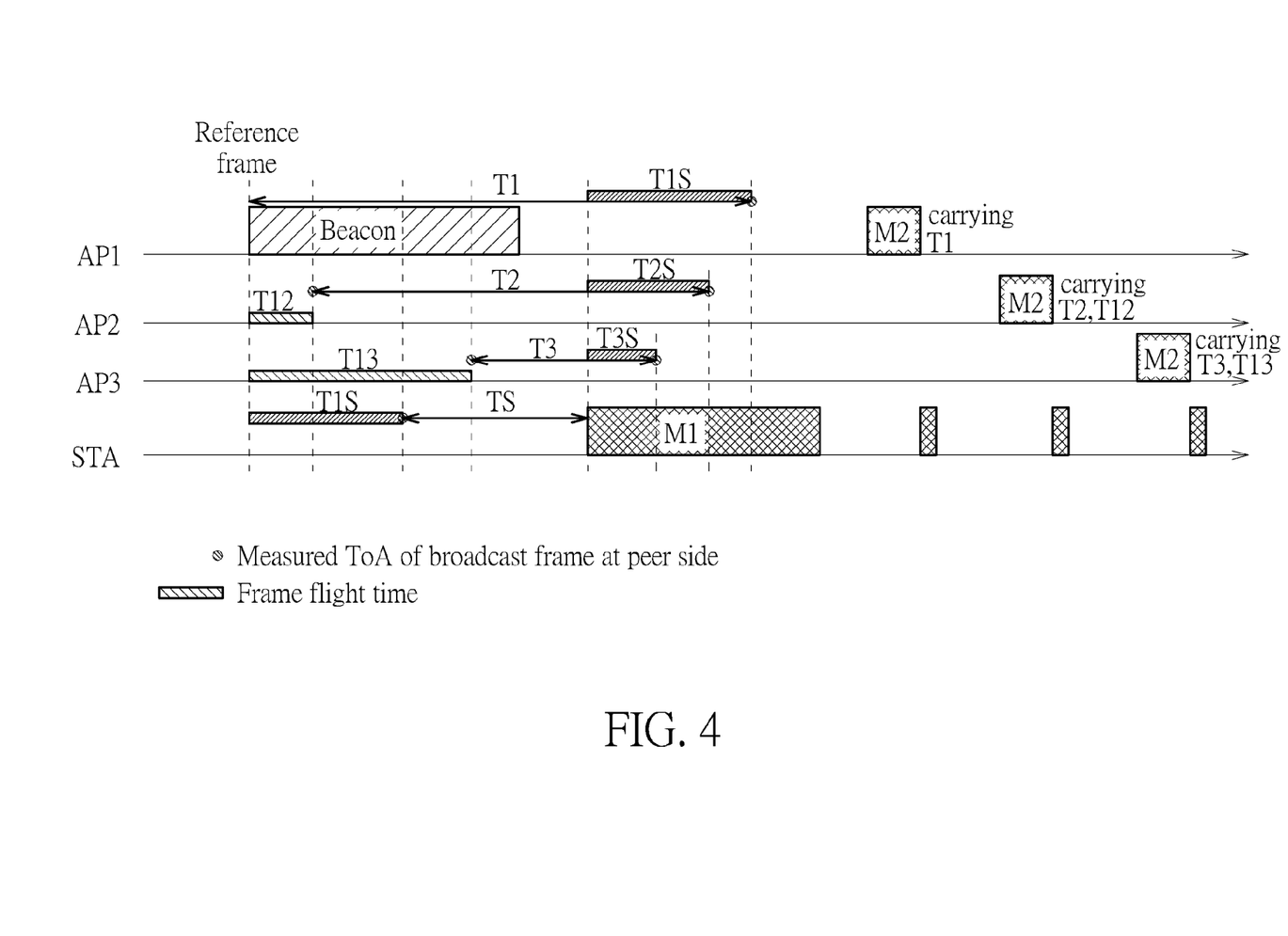
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where the electronic device (labeled "STA" in FIG. 4, for better comprehension) may perform operations under control of the processing circuit 110. In this embodiment, some of the APs shown in FIG. 2, such as a set of APs {AP1, AP2, AP3} labeled at the leftmost of FIG. 4, can be taken as examples of the responders mentioned in Step 320.

According to this embodiment, the frames exchanged for the timing measurement with the three APs AP1, AP2, and AP3 may comprise the pre-association broadcast request frame M1 shown in FIG. 4, which can be taken as an example of the pre-association broadcast request frame mentioned in Step 310, and may further comprise the three pre-association uni-cast response frames {M2} shown in FIG. 4, which can be taken as examples of the pre-association uni-cast response frames mentioned above. For example, the pre-association uni-cast response frame M2(1) (labeled "M2" in FIG. 4, for brevity) sent from the AP AP1 may carry a time interval parameter T1, the pre-association uni-cast response frame M2(2) (labeled "M2" in FIG. 4, for brevity) sent from the AP AP2 may carry a set of time interval parameters T2 and T12, and the pre-association uni-cast response frame M2(3) (labeled "M2" in FIG. 4, for brevity) sent from the AP AP3 may carry another set of time interval parameters T3 and T13.

As shown in FIG. 4, the time interval parameter T1 indicates the time interval between a time of departure (ToD) of the reference frame under consideration (e.g. a broadcast frame from the AP AP1, such as a beacon of the AP AP1 in this embodiment) and a time of arrival (ToA) of the pre-association broadcast request frame M1, the ToA measured at the associated peer side such as the AP AP1. In addition, the time interval parameter T12 indicates the flight time (i.e. the time of flight, or the time of electromagnetic wave propagation) of this reference frame (e.g. this broadcast frame from the AP AP1, such as the beacon of the AP AP1 in this embodiment) between the APs AP2 and AP1, and the time interval parameter T13 indicates the flight time of this reference frame (e.g. this broadcast frame from the AP AP1, such as the beacon of the AP AP1 in this embodiment) between the APs AP3 and AP1, where the time interval parameters T12 and T13 can be calculated or measured in advance. As the locations of the three APs AP1, AP2, and AP3 are supposedly to be known before the timing measurement, and they can be regarded as given parameters for the timing measurement. Additionally, the time interval parameter T2 indicates the time interval between a ToA of this reference frame (more particularly, the ToA measured at the associated peer side such as the AP AP2) and a ToA of the pre-association broadcast request frame M1 (more particularly, the ToA measured at the associated peer side such as the AP AP2), and the time interval parameter T3 indicates the time interval between a ToA of this reference frame (more particularly, the ToA measured at the associated peer side such as the AP AP3) and a ToA of the pre-association broadcast request frame M1 (more particularly, the ToA measured at the associated peer side such as the AP AP3).

In practice, the APs AP1, AP2, and AP3 (more particularly, their own processing circuits such as the processors therein, which can be implemented with the aforementioned processor executing the associated program codes for the APs AP1, AP2, and AP3, respectively) may perform measurement operations to obtain the time interval parameters T1, T2, and T3, respectively. In addition, the electronic device STA (more particularly, the processing circuit 110 therein) may perform at least one measurement operation to obtain the time interval parameter TS. As shown in FIG. 4, the time interval parameter TS indicates the time interval between a ToA of this reference frame (more particularly, the ToA measured at the associated peer side such as the electronic device STA) and a ToD of the pre-association broadcast request frame M1 (more particularly, the ToD measured at the electronic device STA).

According to this embodiment, the objective of the control scheme shown in FIG. 4 may comprise: solving for the time interval parameters T1, T2S, and T3S, in order to calculate or estimate the distances between the electronic device STA and the APs AP1, AP2, and AP3, respectively. For example, the electronic device STA (more particularly, the processing circuit 110 therein) may calculate the time interval parameters T1S, T2S, and T3S based on the following equations:

$$T1=T1S+TS+T1S;$$

$$T12+T2=T1S+TS+T2S;\text{ and}$$

$$T13+T3=T1S+TS+T3S;$$

where the meanings of these equations are illustrated with the corresponding time intervals shown in FIG. 4. Please note that the above equations can be re-written to be Equations (1), (2), and (3), respectively, as shown below:

$$T1S=(T1-TS)/2 \qquad (1);$$

$$T2S=(T12+T2)-(T1S+TS) \qquad (2);$$

$$T3S=(T13+T3)-(T1S+TS) \qquad (3).$$

Thus, based on Equation (1), the electronic device STA (more particularly, the processing circuit 110 therein) may calculate the time interval parameter T1S according to the time interval parameters T1 and TS. In addition, based on Equation (2), the electronic device STA (more particularly, the processing circuit 110 therein) may calculate the time interval parameter T2S according to the time interval parameters T12, T2, T1S, and TS. Additionally, based on Equation (3), the electronic device STA (more particularly, the processing circuit 110 therein) may calculate the time interval parameter T3S according to the time interval parameters T13, T3, T1S, and TS.

Based on the method 300 shown in FIG. 3, and more particularly, the control scheme shown in FIG. 4, the processing circuit 110 can perform the aforementioned timing measurement according to the aforementioned information carried by the plurality of response frames corresponding to the pre-association broadcast request frame, without need to establish the association between the initiator (i.e. the electronic device) and any of the responders first. For example, the processing circuit 110 can perform the aforementioned timing measurement according to the information carried by the plurality of response frames mentioned in Step 320, without establishing the association between the initiator (i.e. the electronic device) and any of the responders in advance. In comparison with the related art, the number of frame exchanges in the wireless network system can be greatly reduced based on the embodiments disclosed above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for estimating a location of an electronic device, the method comprising the steps of:
   sending a pre-association broadcast request frame by the electronic device to multiple responders in a wireless network system;
   receiving a plurality of response frames corresponding to the pre-association broadcast request frame from the multiple responders; and
   performing a timing measurement according to information carried by the plurality of response frames for determining the location of the electronic device, wherein one of the multiple responders sends a reference frame before the pre-association broadcast request frame is sent, and the information carried by at least one of the plurality of response frames comprises time interval information corresponding to at least one time interval starting from a time point when the reference frame is sent.

2. The method of claim 1, wherein each of the response frames is sent from one of the responders.

3. The method of claim 2, wherein within the plurality of response frames, a number of response frame received from any of the responders is equal to one.

4. The method of claim 1, wherein each of the response frames is a pre-association uni-cast response frame received from one of the responders.

5. The method of claim 4, wherein the responders comprise access points (APs) AP1 and AP2, and the plurality of response frames comprises a response frame M2(1) sent from the AP AP1 that carries a time interval parameter T1, and a response frame M2(2) sent from the AP AP2 that carries time interval parameters T2 and T12.

6. The method of claim 5, wherein the time interval parameter T1 indicates a time interval between a time of departure (ToD) of the reference frame and a time of arrival (ToA) of the pre-association broadcast request frame; the time interval parameter T12 indicates a flight time of the reference frame between the APs AP2 and AP1, wherein the time interval parameters T12 is calculated or measured in advance; and the time interval parameter T2 indicates a time interval between a ToA of the reference frame and a ToA of the pre-association broadcast request frame.

7. The method of claim 6, wherein the reference frame is a broadcast frame from the AP AP1.

8. The method of claim 6, wherein the step of performing the timing measurement according to the information comprises:
   performing the timing measurement according to the information carried by the plurality of response frames corresponding to the pre-association broadcast request frame and according to a time interval parameter TS obtained within the electronic device, wherein the time interval parameter TS indicates a time interval between a ToA of the reference frame, measured at the electronic device STA, and a ToD of the pre-association broadcast request frame, measured at the electronic device.

9. The method of claim 1, wherein the step of performing the timing measurement according to the information comprises:
   performing the timing measurement according to the information carried by the plurality of response frames corresponding to the pre-association broadcast request frame, without need to establish association between the electronic device and any of the responders first.

10. The method of claim 1, wherein the step of performing the timing measurement according to the information comprises:
    performing the timing measurement according to the information carried by the plurality of response frames corresponding to the pre-association broadcast request frame, without establishing association between the electronic device and any of the responders.

11. An apparatus for estimating a location of an electronic device, the apparatus comprises at least one portion of the electronic device, the apparatus comprising:
    a transceiver arranged to transmit or receive information for the electronic device; and a processing circuit, coupled to the transceiver, arranged to control operations of the electronic device, wherein the processing circuit sends, by utilizing the transceiver, a pre-association broadcast request frame to multiple responders in a wireless network system, receives a plurality of response frames corresponding to the pre-association broadcast request frame from the multiple responders, and performs a timing measurement according to information carried by the plurality of response frames for determining the location of the electronic device, wherein one of the multiple responders sends a reference frame before the pre-association broadcast request frame is sent, and the information carried by at least one of the plurality of response frames comprises time interval information corresponding to at least one time interval starting from a time point when the reference frame is sent.

12. The apparatus of claim 11, wherein each of the response frames is sent from one of the responders.

13. The apparatus of claim 12, wherein within the plurality of response frames, a number of response frame received from any of the responders is equal to one.

14. The apparatus of claim 11, wherein each of the response frames is a pre-association uni-cast response frame received from one of the responders.

15. The apparatus of claim 14, wherein the responders comprise access points (APs) AP1 and AP2, and the plurality of response frames comprises a response frame M2(1) sent from the AP AP1 that carries a time interval parameter T1, and a response frame M2(2) sent from the AP AP2 that carries time interval parameters T2 and T12.

16. The apparatus of claim 15, wherein the time interval parameter T1 indicates a time interval between a time of departure (ToD) of the reference frame and a time of arrival (ToA) of the pre-association broadcast request frame; the time interval parameter T12 indicates a flight time of the reference frame between the APs AP2 and AP1, wherein the time interval parameters T12 is calculated or measured in advance; and the time interval parameter T2 indicates a time interval between a ToA of the reference frame and a ToA of the pre-association broadcast request frame.

17. The apparatus of claim 16, wherein the reference frame is a broadcast frame from the AP AP1.

18. The apparatus of claim 16, wherein the processing circuit performs the timing measurement according to the information carried by the plurality of response frames corresponding to the pre-association broadcast request frame and according to a time interval parameter TS obtained within the electronic device, wherein the time interval parameter TS indicates a time interval between a ToA of the reference frame, measured at the electronic device STA, and a ToD of the pre-association broadcast request frame, measured at the electronic device.

19. The apparatus of claim 11, wherein the processing circuit performs the timing measurement according to the information carried by the plurality of response frames corresponding to the pre-association broadcast request frame, without need to establish association between the electronic device and any of the responders first.

20. The apparatus of claim 11, wherein the processing circuit performs the timing measurement according to the information carried by the plurality of response frames corresponding to the pre-association broadcast request frame, without establishing association between the electronic device and any of the responders.

* * * * *